Jan. 18, 1949.  L. J. KOCI  2,459,170
TOASTER CONTROL MECHANISM
Filed March 28, 1942.  6 Sheets-Sheet 1

Jan. 18, 1949. L. J. KOCI 2,459,170
TOASTER CONTROL MECHANISM
Filed March 28, 1942 6 Sheets-Sheet 2

Inventor:
Ludwik J. Koci
By
McCanna, Winterim & Marshall
Attys.

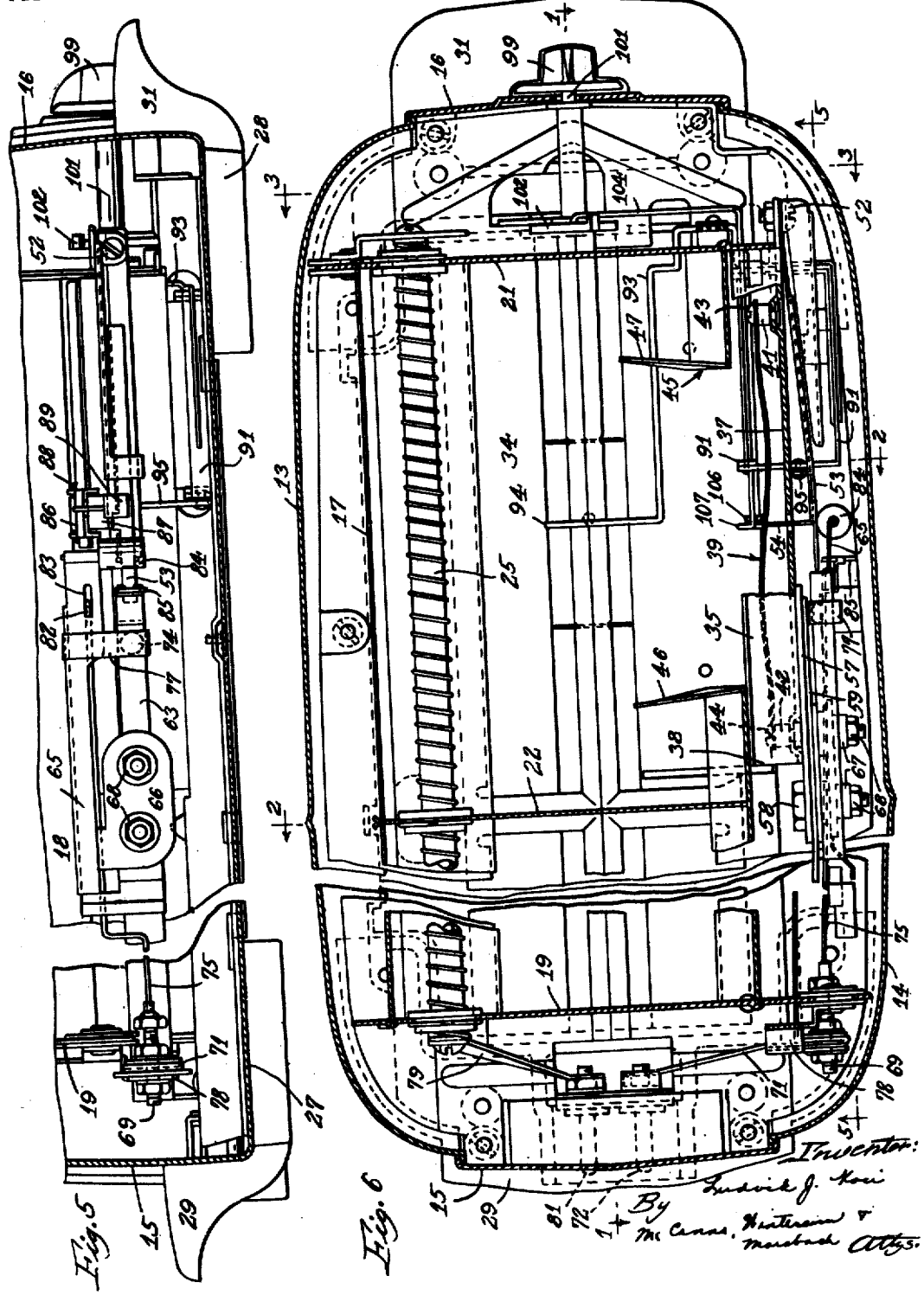

Jan. 18, 1949. L. J. KOCI 2,459,170
TOASTER CONTROL MECHANISM
Filed March 28, 1942 6 Sheets-Sheet 4
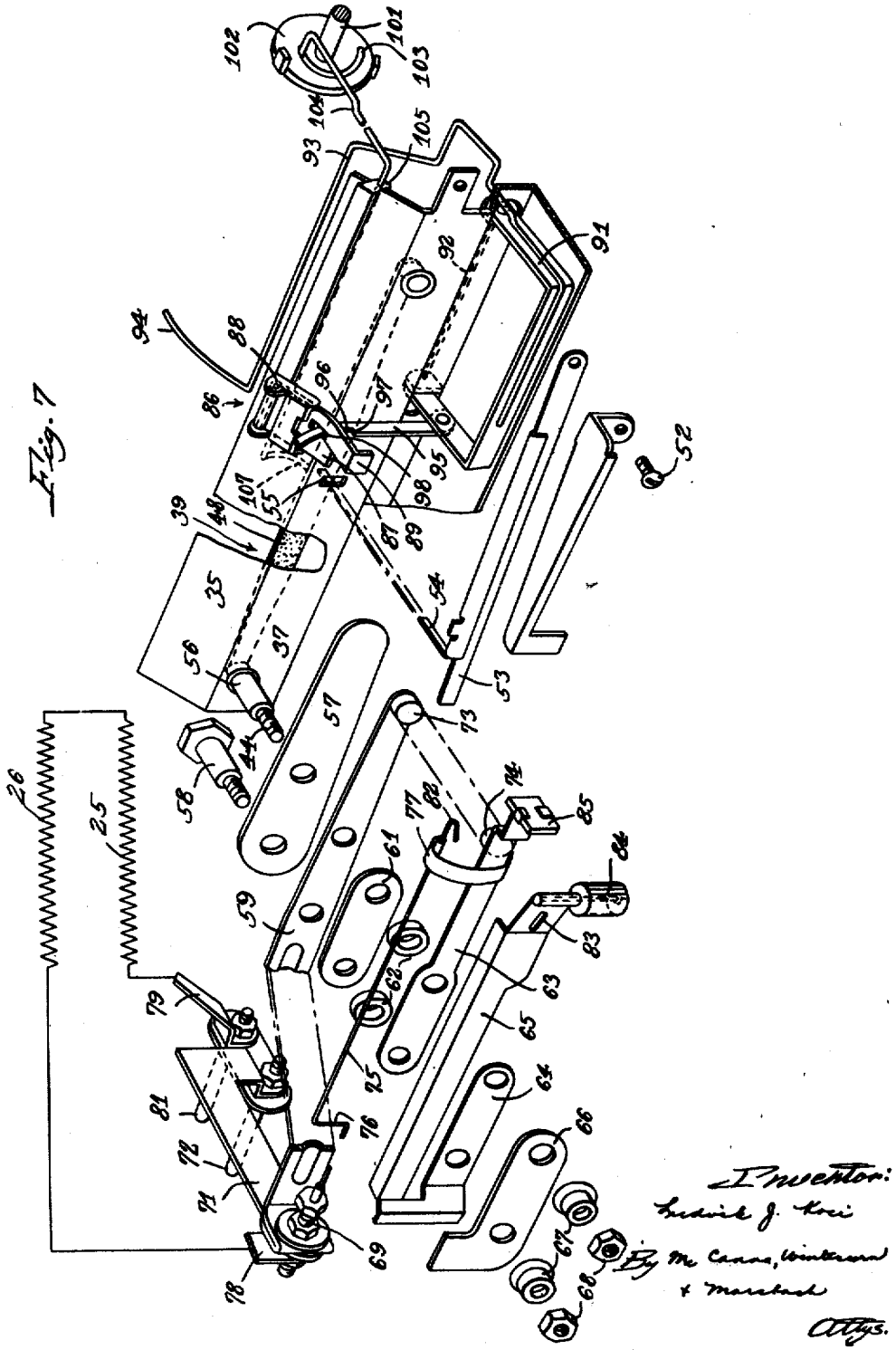

Jan. 18, 1949. L. J. KOCI 2,459,170
TOASTER CONTROL MECHANISM
Filed March 28, 1942 6 Sheets-Sheet 5
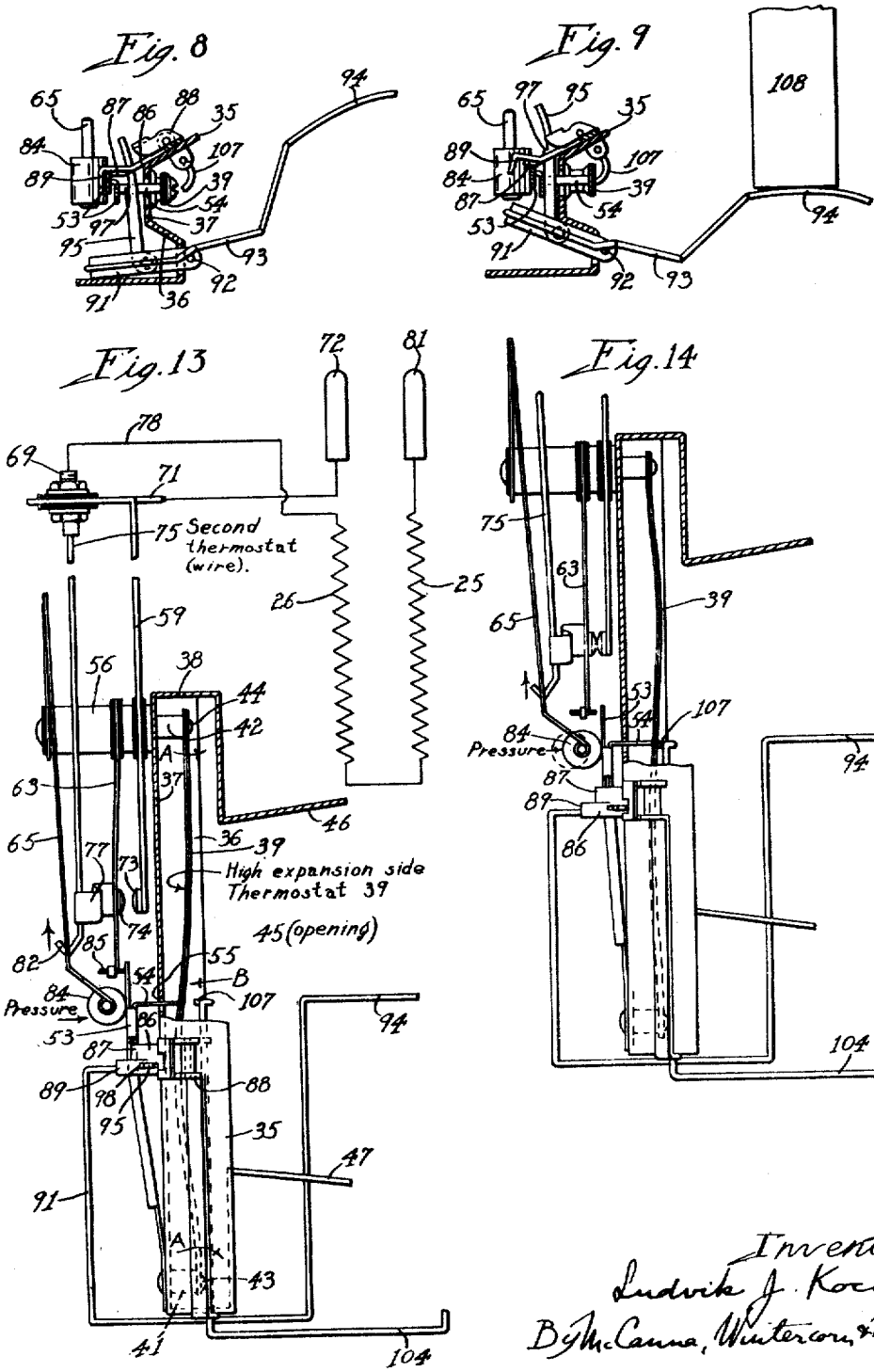

Jan. 18, 1949.  L. J. KOCI  2,459,170
TOASTER CONTROL MECHANISM
Filed March 28, 1942  6 Sheets-Sheet 6
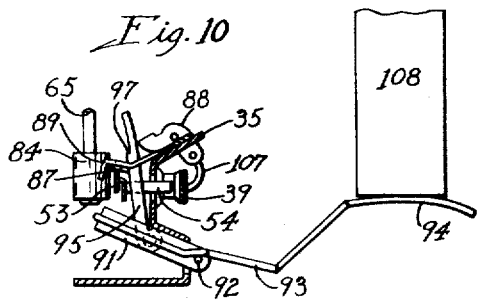
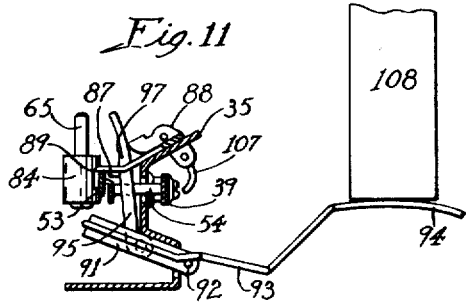
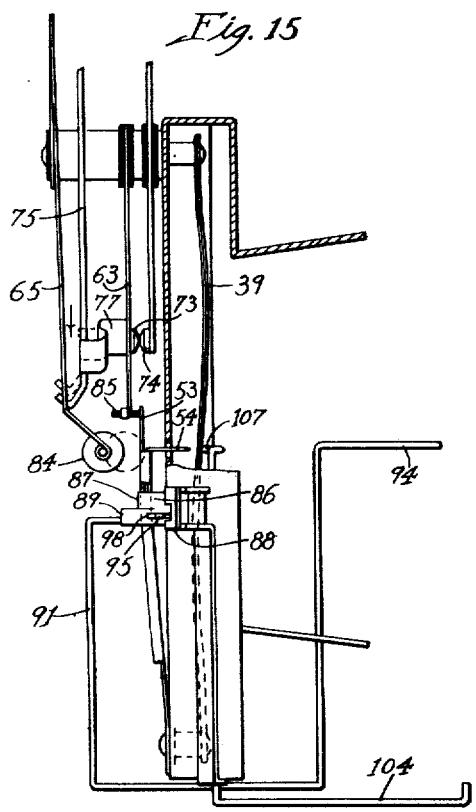
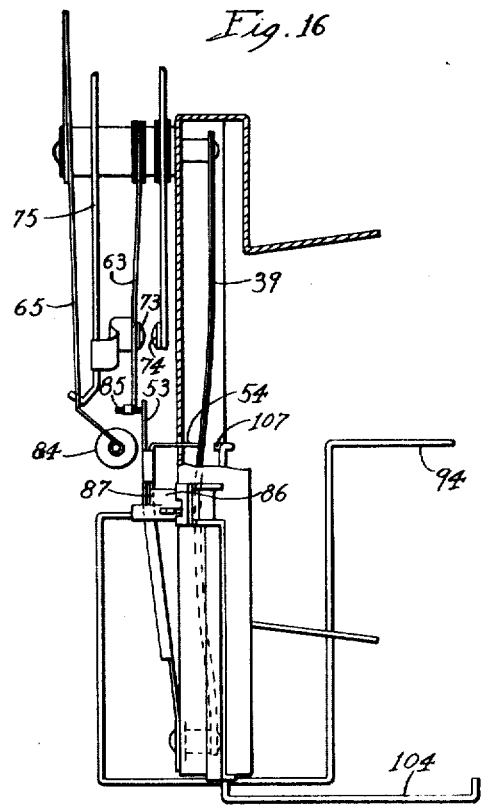
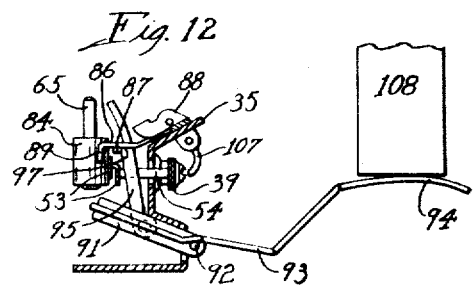
Inventor:
Ludvik J. Koci
By McCanna, Wintercorn & Morsbach
attys.

Patented Jan. 18, 1949

2,459,170

UNITED STATES PATENT OFFICE 2,459,170

TOASTER CONTROL MECHANISM

Ludvik J. Koci, Chicago, Ill., assignor to Sunbeam Corporation, Chicago, Ill., a corporation of Illinois Application March 28, 1942, Serial No. 436,649

33 Claims. (Cl. 99—331)

This invention relates primarily to toasters and similar cooking devices, but it is adapted for application in other arts in cases where it is desired to raise the temperature of an object to a certain value and then de-energize the heating means until some other manual or predetermined operation takes place.

The invention has special reference to thermostatic control means of the character described in my copending application Serial No. 425,299, filed January 1, 1942, entitled Radiation thermostat control for toaster and the like, now abandoned, the disclosure being embraced in my continuation-in-part application Serial No. 639,934 filed Jan. 9, 1946 and allowed on April 27, 1948. In such application I have shown and claimed a toaster wherein the bread is toasted by radiated heat, and wherein the color of the bread surface is controlled by thermostatic mechanism which cycles "On" and "Off" and in which the slice can be left in the toaster to produce so-called Melba toast.

The present invention may be considered an improvement thereover, and contemplates thermostat mechanism of the general type therein described arranged to terminate the toasting operation and de-energize the toaster at the conclusion of one of the thermostat operations to produce toast of only surface crispness as distinguished from Melba toast.

An object of the invention is the provision of a control mechanism responsive to radiation emitted by the bread slice which will cause the toaster to come "On" when a slice of bread is inserted, which will shut "Off" when the bread is toasted to a preselected temperature, and which will not again come "On" until after a new piece of bread is inserted.

Another object of the invention is the provision of a toaster control mechanism wherein the switch contacts are latched in an open position in response to operation of the thermostat, and means are provided operable by the force delivered by a slice of bread dropping into the toaster for releasing the latch to reposition the parts for a subsequent toasting operation.

Another object of the invention is the provision of a control mechanism of the class described having novel reset mechanism for resetting the thermostat.

A further object of the invention is the provision of a toaster control mechanism wherein the control thermostat is reset by means of pressure applied thereto when a slice of bread is inserted into the toaster, and this resetting pressure is gradually removed during the toasting interval.

I have also aimed to provide a control mechanism of the character described wherein the control thermostat is returned to the "On" position and is retained therein by temperature responsive means arranged to release the thermostat prior to its reaching a temperature to move to an "Off" position, and more particularly wherein the temperature responsive means comprises a temperature expansible element such as a wire.

A further object of the invention is the provision of a control mechanism of the character described wherein the thermostat is returned to an "On" position by the application of pressure thereto by a secondary temperature responsive means, and latch means is provided for retaining the switch in open position releasable by insertion of a slice of bread.

I have further aimed to provide a control mechanism of the character described wherein novel latch means is provided for latching the contacts and the reset mechanism in an "Off" position.

I have also aimed to provide a control mechanism of the character described which includes a thin bimetallic strip shaped, stressed and mounted so as to snap from one position upon reaching a temperature corresponding to a preselected bread temperature, and to be incapable of return in response to temperature change, and wherein switch contacts are opened in response to movement of the thermostat out of said position and latched in open position to terminate a toasting interval, and wherein temperature responsive means is provided for exerting a pressure on the strip to return it to said position.

A further object of the invention is the provision of a control device of the character described including a bimetallic strip responsive to the temperature of the bread slice, reset means operative on the strip to move it from an "Off" to an "On" position releasable from the strip in response to the flow of current during the initial phase of a toasting operation, and latch means for restraining the action of the reset means releasable in response to the insertion of a slice of bread into the toaster.

A further object of the invention is the provision of a control mechanism of a kind adapted for controlling successive toasting operations or the like and in which a thermostat device has "On" and "Off" movements to turn on and off the current and thereby determine the toasting intervals, characterized by the provision of delaying means coacting with the thermostat device to prevent movement of the thermostat to the "On" position for a predetermined period when a bread slice is inserted immediately or soon after a preceding toasting interval and for positively actuating or moving the thermostat to the "On" position after said predetermined period. In the present embodiment of my invention I have provided thermally responsive means for accomplishing this delaying action of the thermostat device but my invention contemplates broadly equivalent means for this purpose.

Other objects and advantages will appear from the following description and the accompanying drawings, in which—

Figure 1 is a vertical section taken longitudinally through a toaster embodying my invention, the section being taken substantially on the line 1—1 of Fig. 6;

Figs. 2 and 3 are vertical sections transversely through the toaster taken substantially on the lines 2—2 and 3—3, respectively, of Fig. 6;

Fig. 5 is a fragmentary vertical section taken just inside the casing of the toaster and showing the control mechanism in elevation, the view being taken substantially on the line 5—5 of Fig. 6;

Fig. 6 is a horizontal section through the toaster shown in Figure 1;

Fig. 7 is an expanded view showing the parts of the control mechanism, the heating elements of the toaster being shown in diagrammatic form; and Figs. 8 through 12 are transverse sections through the control mechanism showing successive positions thereof corresponding to successive phases in a toasting operation; and Figs. 13 through 16 are diagrammatic plan views showing the successive positions of the control mechanism corresponding with Figs. 8 to 11, respectively.

Figure 1:
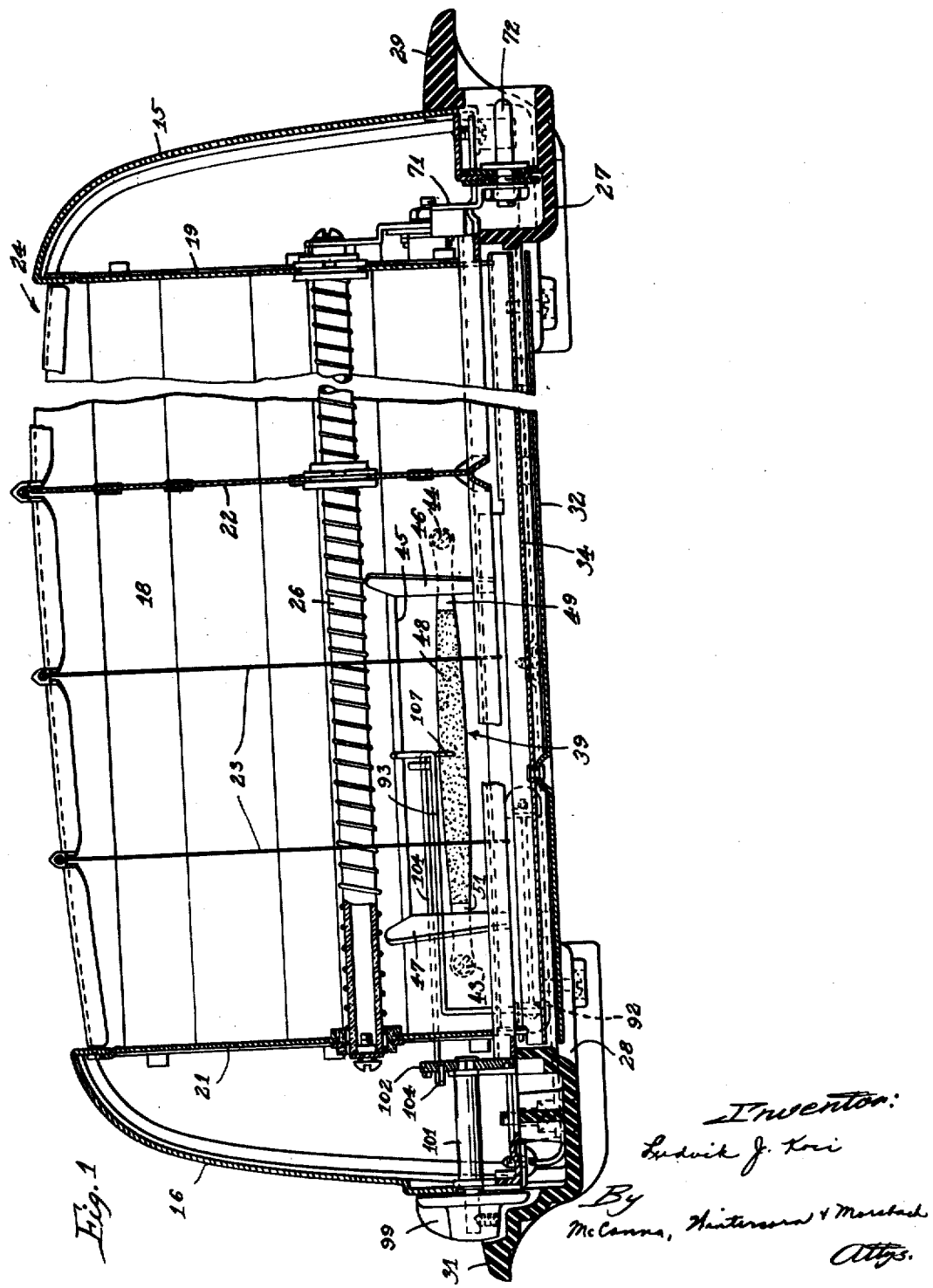
Figure 2:
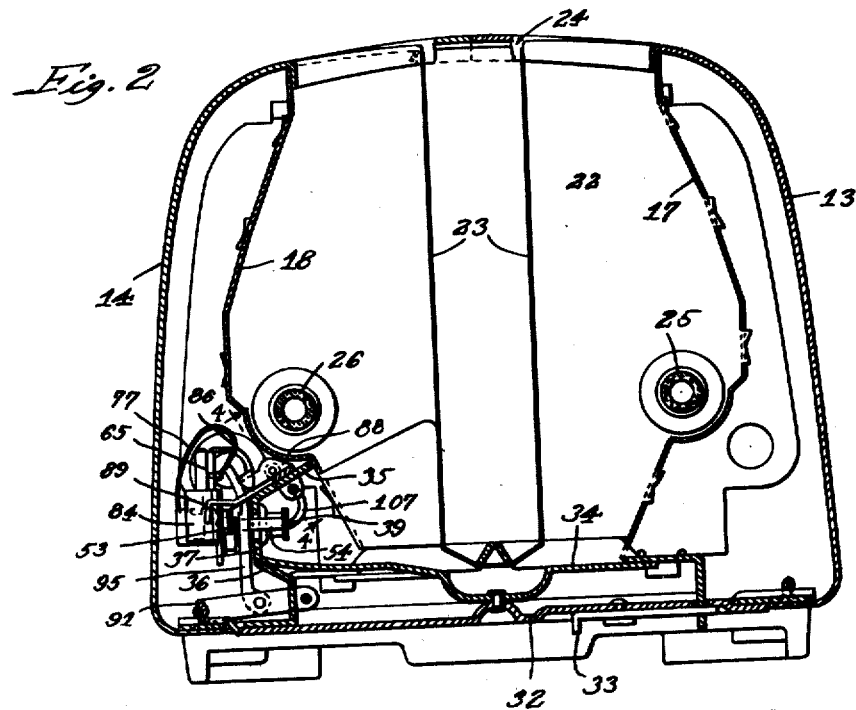
Figure 3:
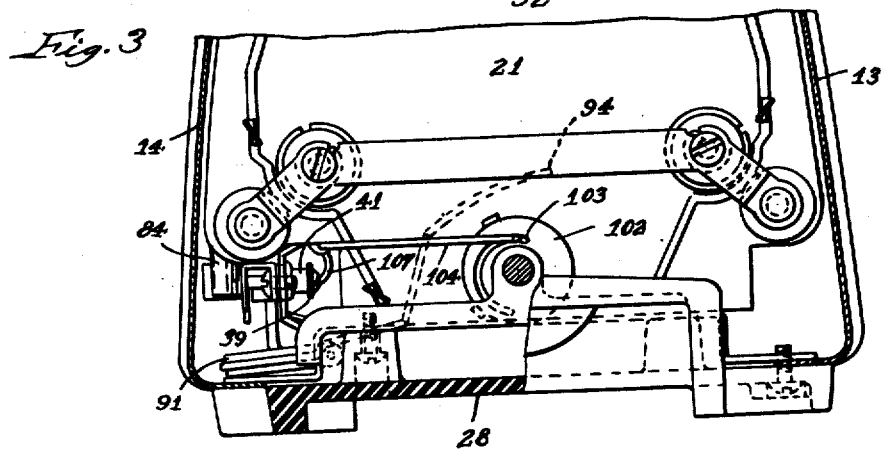

Referring first primarily to Figs. 1 through 3, the invention is herein embodied in a reflector type toaster such as shown and more particularly described in my above-identified application, and including an enclosing casing having side walls 13 and 14 and end walls 15 and 16. Two toasting chambers arranged in end to end relationship are formed within the casing by reflectors 17 and 18 and end walls 19 and 21 and by a centrally disposed transverse partition 22. The bread slices are retained in upright position by vertically disposed wires 23 arranged in spaced relation along opposite sides of a top opening, as indicated at 24, through which the bread slices are inserted. The slices are toasted by the action of heating elements 25 and 26 positioned adjacent the reflectors 17 and 18, respectively, the reflectors being shaped to distribute the radiant energy from the toasting elements uniformly over the surface of opposite sides of the bread slices. The toaster is supported on a table or the like by insulating end members 27 and 28 having legs which support it in spaced relation, the end members having handles 29 and 31 for handling the toaster. The bottom of the casing is closed by a removable bottom member 32 secured in place by a latch 33, the bottom carrying a crumb tray 34 serving the usual functions.

According to the present invention, a ply metal thermostatic strip is located in spaced relation to a surface of the bread slice so as to be responsive to the average heat radiation emitted from an accurately defined portion of the surface. Electrical contacts or other control means are located so that the contacts are separated in response to movement of the strip when it becomes heated to a predetermined degree. Latch means are provided for latching the contacts in an open position when moved to this position by the thermostat so as to terminate the toasting operation. A latch release member is actuated by the insertion of a slice of bread into the toaster for releasing the contacts and permitting the same to close when a bread slice is inserted.

The principle of operation of the control mechanism is based upon the fact that the surface of a bread slice emits a definite amount of radiant heat per unit area of surface when brought to a preselected temperature and on the fact that within the limits of permissible error a preselected temperature at the bread surface will always correspond to a certain brownness thereof. For example, it appears that with bread of normal composition practically no visible chemical change occurs in the surface of a slice subjected to temperatures below about 350° F. However, as the temperature approaches 500° F. chemical changes occur at an increasing rate. Time and the rate of heat input are also factors in the degree of chemical change produced, but the temperature factor has been found to be so critical under the conditions prevailing in an ordinary bread toaster as to make the other two factors of negligible importance. Thus when the bread surface, during the toasting operation, reaches a predetermined color, the heat emission therefrom will always be substantially the same, and this radiation or emission may be used for the purpose of actuating control mechanism.

Directing attention now more particularly to Figs. 5, 6 and 7, the control mechanism includes a thermostat enclosure secured to the back of reflector 18 below the heating element 26 as shown in Fig. 2, this enclosure including an upper wall 35, a lower wall 36, a back wall 37 and an end wall 38 (Fig. 6), the side and end walls being secured at their forward edge against the back of the reflector 18 in such manner that the interior of the enclosure is substantially shielded against radiation from the heating element 26. A bimetal thermostat designated generally by the numeral 39, in this instance comprising a strip of thermostatic bimetal, is positioned within the enclosure and is fixedly supported at its ends on metal sleeves 41 and 42 by means of bolts 43 and 44 attached to and passing through the rear wall 37 of the enclosure. The high expansion side of the strip is disposed on the outer side, that is, away from the bread slice.

The thermostatic strip 39 is of novel form and is so constructed and mounted that compensation or correction for temperature changes of the enclosure and surrounding elements is produced within the body of the strip, the thermostat herein shown being one species of the generic invention described and claimed in my copending application Serial No. 327,255, filed April 1, 1940, entitled "Thermostat" now Patent No. 2,332,518. Accordingly, the bimetallic strip is mounted at its ends so that the end portions are held against angular motion in response to change in temperature. The strip is compressively stressed longitudinally so as to obtain snap acting operation, the longitudinal stress being of sufficient degree to prevent return movement of the thermostat by itself after cooling back to normal temperature. That is, the snap acting energy is made to be of such degree that the toaster after it has once shut off will not come on again due to cooling of the thermostat to normal room temperatures. This amount of stress also serves to assure a noticeable click when the strip snaps from the "On" to the "Off" position so as to indicate the end of the toasting operation. In this instance the strip is in the form of a narrow and thin bimetallic strip having a thickness in the region of .008" and a width substantially that shown in the drawings, but it will be understood that the particular dimensions of the strip may vary considerably depending upon the operating characteristics desired. The composition of the strip is determined by the usual factors. As heretofore pointed out, the ends of the strip are firmly pressed against the sleeves 41 and 42 by the screws 43 and 44 to prevent angular motion thereof in response to temperature changes and, as will be noted from Figure 1, the strip is wider at the center and tapers toward the ends so that the end portions are of somewhat lesser width than the center. These shape characteristics together with the manner of mounting causes the strip to exhibit not only a primary thermostatic action responsive to the temperature of the bread slice, but in addition, a secondary compensating thermostatic action of the desired degree responsive to the temperature of the enclosure and surrounding elements. The arrangement should be such as to produce maximum response of the central portion of the strip to the average temperature of the surface of the slice of bread being toasted and minimum response thereof with respect to the temperature of other objects surrounding the toaster, such as the toasting elements and the enclosure. With this object in view, the opening 45 is provided in the reflector 18, and this opening together with the enclosure, is so arranged that the enclosure will shield the strip from undesirable radiation and from excessive and unreliable thermo-convection currents. The inside of the enclosure is caused to be bright and to be a reflector of such shape as to receive radiation from a large area of the bread slice and direct all such radiation which is not ordinarily incident on the thermostat, onto this thermostat after proper redirection by the reflector. As will best be seen from Figure 1, the opening 45 is of lesser length than the length of the strip so that the extreme ends of the strip and the mountings therefor are not exposed directly to the radiant heat from the bread slice, but so that the strip is so exposed throughout the mid portion of its length. Positioned at the ends of the opening 45 are deflectors 46 and 47 projecting inwardly toward the surface of the bread slice to prevent radiation from the ends of the toaster and radiation from the heating element 25 past the ends of the bread slice from entering the enclosure and being incident on the strip during a toasting interval. In this way the end portions of the thermostat are shielded from direct radiation from the surface of the bread and from other undesirable radiation so as to be primarily temperature responsive to the enclosure and surrounding elements, whereas the mid portion is rendered primarily responsive to the temperature of the bread slice. Likewise, the degree of thermal responsiveness of the central portion of the strip to the surface of the bread slice is further enhanced by treating the central portion of the strip, front and back, so that this surface has a high absorption coefficient for infra-red rays. This condition may be produced by coating the central portion with a (black) coating as indicated at 48 (Figure 1) or by otherwise treating the surface of the strip to increase the coefficient of absorption for heat emission from the bread slice. This coated portion of the strip is essentially that producing the primary thermally responsive action in response to emission from the bread slice. The end portions of the strip indicated generally at 49 and 51 are arranged to present a polished and highly reflective surface so as to have a minimum coefficient of absorption for the infra-red and to be largely temperature responsive to the enclosure and adjacent parts and thus contribute to the thermostatic movement a compensating effect for changes of temperature thereof, these portions of the strip setting up a thermostatic action which is opposite to that of the coated portion. Accordingly, a rising temperature at the bright ends will cause an increase in force tending to produce motion in a direction opposite to that caused by rise in temperature of the central portion, according to the principle disclosed in my above mentioned application for Thermostat.

The ratio between the width of the end portions and the width of the central portion depends upon the thermal coupling coefficient between the thermostat, the bread surface, and the surroundings adjacent to the thermostat. By thermal coupling coefficient I mean the relative degree of thermal responsiveness between the elements involved. For example, by high coupling coefficient between the central portion of the strip and the bread slice I mean a high degree of responsiveness of the central portion of the thermostat to changes in the temperature of the bread slice surface. Thus it will be seen that with a high coupling coefficient with respect to the bread surface and a low coupling coefficient with respect to the enclosure surrounding the thermostat, a thermostat is required in which the ends are very narrow as compared with the central portion for the reason that only a small degree of compensation is required. Such a condition would prevail under circumstances in which practically all of the heat delivered to the strip would be by radiation from the bread slice and a very small amount would be obtained from surrounding objects. From a practical standpoint, however, there is substantial response of the thermostat to the secondary heat from surrounding objects, and it is therefore necessary that the end portions 49 and 51 be of such width as to exert an appreciable compensating effect on the net movement of the strip. The exact width will depend, of course, upon the thermal characteristics of each particular design, but it is advisable and desirable to design the combination so as to obtain a minimum practical thermal coupling between the central portion of the strip and its immediate surroundings so as to require a minimum degree of compensation.

Attention is directed to the fact that since the strip is so constructed and mounted as to produce a compensated movement, a preselected point on the center portion of the strip does not always snap at the same temperature, for the reason that the end portions exert compensating forces on the central portion thereof to compensate for changes in temperature of the enclosure. Therefore, the central portion will move at preselected temperatures of the bread surface but at variable thermostat temperatures due to changes in the temperature of the structure. Thus, assuming that the high expansion side of the strip faces away from the bread slice, it will be seen that if the ends of the central portion of the strip were supported for free pivotal movement, the central portion of the strip would move away from the bread slice at a predetermined temperature when the central portion was uniformly heated, as indicated by the direction arrow B in Fig. 13. On the other hand, if I consider only the end portions 49 and 51 supported as shown, if these end portions were heated to a uniform degree these portions would tend to warp upon increase of temperature in a direction such that the portions thereof adjacent the central portion would move toward the bread slice due to the fact that the extreme ends of the strip are prevented from angular thermostatic warpage, as indicated by the direction arrows A in Fig. 13. Since the central portion and the end portions constitute a single piece of bimetal, these two forces are superimposed upon each other, and consequently as the end portions become more highly heated, the central portion must assume a higher temperature before it can snap to the position away from the bread slice representing an open contact position. It will therefore be seen that the thermostat strip has within itself and its mounting the means for producing the required composite thermostatic action and by proportioning the forces developed by these portions of the strip in accordance with the degree of compensation required for any particular construction, the required degree of compensation can be inherently produced. It will, of course, be understood that no precise line of demarkation can be drawn between the central portion and the end portions, and that this is doubtless an area as distinguished from any particular line. In other words, the two forces are simultaneously produced in the strip, and of course exert their effect throughout the length of the strip, progressively varying in degree from end to end thereof as particularly described in connection with Figs. 5 to 8 of my above-identified application on "Thermostat."

Directing attention now more particularly to Figs. 6, 7 and 13, attached to the back 37 of the enclosure by means of a screw 52 is a latch bar 53 in a horizontal position, the latch bar having a finger 54 which extends through an opening 55 in the back of the enclosure. The latch bar is formed of spring material adapted to be deflected laterally in response to force applied to the end of the finger 54, but biased to move said finger to the left, viewing Fig. 13. The bolt 44 is of substantial length and carries a sleeve 56 of insulating material upon which is positioned a plate 57 of insulation material, the plate 57 receiving a second bolt 58 which serves with the bolt 44 to hold the subsequently described parts in assembled relationship, as will be apparent from Fig. 7. Also received on the insulating sleeve of bolts 44 and 58 is a bus-bar 59, an insulating plate 61, spacers 62, a flexible switch lever 63, a bracket 64 carrying a spring member 65, an insulating plate 66, and spacers 67, all of these elements being held in assembled face to face relationship on the screws 44 and 58 by means of nuts 68. The bus-bar 59 extends along the side of the toaster within the casing and is attached to a screw 69 in insulating relationship therewith, the screw in turn being carried on a bus-bar 71 electrically connected to a prong 72 arranged for cooperation with a conventional attachment plug. The free end of the bus-bar 59 carries a contact 73 arranged for cooperation with a movable contact 74 carried adjacent the end of the flexible switch lever 63, the switch lever being tensioned or biased to normally close the contacts 73 and 74.

Attached to the screw 69 is a wire 75, in this instance formed of "Nichrome" or metal of similar composition, the wire having a bend therein as indicated at 76 to impart resilience thereto. The wire extends from the screw 69 in a generally disposed parallel direction with respect to the bus-bar 59 and is connected to the switch lever 63 by a thin silver foil or other resilient conductor 77. The screw 69 is electrically connected by means of a bus-bar 78 and other conventional electrical connections through the toasting elements 26 and 25 and thence through bus-bar 79 to the second prong 81 arranged in spaced relation to the prong 72 for cooperation with the usual appliance plug. Thus when the contacts 73 and 74 are closed, current flows through a circuit defined by the prong 72, the bus-bar 71, the bus-bar 59, contacts 73 and 74, conductor 77, wire 75, screw 69, bus-bar 78, toasting elements 26 and 25, bus-bar 79 and prong 81.

The end of the wire 75 has a hook thereon as indicated at 82 receivable in a slot 83 in the end of the spring member 65, and the end of the spring member 65 carries a roller 84 of insulation material positioned adjacent the free end of the latch bar 53 as will best be seen from Figs. 6 and 13. The spring member 65 is biased to move roller 84 to the left, viewing Figs. 8 and 13, away from the latch bar 53. The wire 75 constitutes a second thermostat which has lengthwise expansion and contraction upon heating and cooling. When contracted, this wire exerts through its hooked end 82 a pull on the spring member 65 which acts against the tension or bias of said member 65 and exerts a force pressing the roller 84 to the right against the latch bar 53. The latch bar 53 is thus pressed against the end 87 of the latch member 86, thereby holding the contact 74 latched in the open position as shown in Figs. 8 and 13. The end of the switch lever 63 carries a block of insulation material 85 disposed adjacent the free end of the latch bar 53, through which insulation block the latch bar 53 has a one-way connection with the switch lever 63 for actuating the switch lever to open or close the contacts 73—74 depending on whether the latch bar 53 is moved to the left or to the right.

The finger 54 is of such length as to be disposed in spaced relation with the center portion of the strip 39, as will be seen from Figs. 10 and 15, so that when the strip reaches its heated position and snaps through center in a direction away from the bread slice, the center portion of the strip contacts the finger 54 moving the finger outwardly and causing the end of the latch bar 53 to engage against the block 85, thus causing the contacts 73 and 74 to separate, interrupting the supply of current to the heating elements 25 and 26.

The latch means are provided for latching the bar 53 in an open position of the contacts 73 and 74; in other words, for preventing the contact 74 from coming back into engagement with contact 73, and this includes a latch member 86 having a lower end portion 87 adapted to drop behind the latch bar 53 when the same moves to the open position of the switch so as to prevent its return. The latch member 86 is pivotally carried on a bracket 88 attached to the top wall 35 of the enclosure, as will be best seen from Figs. 7 and 4. The latch member also has an extended finger having a depending end 89 adapted to limit the outer movement of the latch bar 53.

Means are provided for releasing the latch, this means including a frame designated generally by the numeral 91 pivotally supported on a lower flange attached to the housing as indicated at 92, the frame having an operating lever 93 which passes through a slot in the lower portion of the enclosure and has a finger 94 projecting outwardly into the space between the wires 23, as will be best seen in Fig. 6, so as to be engaged by the slice of bread inserted into the toaster. Projecting upwardly from the frame 91 and pivotally carried thereon is a latch release lever 95 notched as shown at 96 so as to provide an upwardly disposed portion of lesser width and a companion shoulder 97, the smaller portion passing through an opening 98 in the latch member. It will be seen from this construction that when a slice of bread is inserted into the toaster engaging the finger 94, the frame 91 is rotated, raising the latch release lever 95 and bringing the shoulder 97 against the latch member 86 to raise the same so that the depending portion 87 is moved out of the path of the latch bar 53, thus permitting the latch bar to be moved to the right under pressure of the roller 84 and permitting the contact 74 to move into engagement with the contact 73 in a manner presently to be described.

Figure 4:
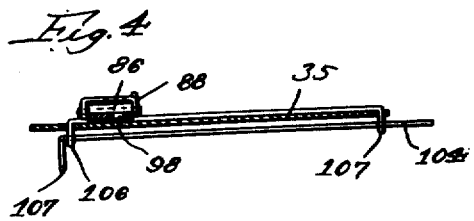
Fig. 4 is a view on the line 4—4 of Fig. 2 showing a portion of the adjustable stop mechanism.

The color of the toast, or in other words, the degree of toasting during each toasting interval, is manually adjustable, and for this purpose the toaster is provided with a knob 99 disposed on the outer side of the casing and attached to a shaft 101 extending through the casing and carrying a cam disk 102 provided with a cam groove 103 which receives the end of a rod 104 rotatably supported, as will best be seen from Fig. 4 on ears 105 and 106 carried on the bracket 88, the rod having an end portion 107 depending into the path of the central portion of the thermostat. This serves as a stop to limit the movement of the central portion of the thermostat 39 when it snaps to its "On" position so that one may vary the temperature to which this main or central portion of the thermostat must be heated before it snaps to the "Off" position.

Referring now more particularly to Figs. 8 through 16, in which the various steps of the toasting operation are shown, Fig. 8 (and corresponding plan view Fig. 13) shows the relationship of the various parts in the normal cold position of the toaster, and in the absence of a slice of bread therein. Under these conditions the contact points 73 and 74 are held open by the latch bar 53. The bimetal strip 39 occupies a position away from the bread slice and the latch 86 prevents movement of the latch bar 53 in a direction which would permit closing of the contacts 73 and 74. In this position of the parts the wire 75 is cold, this wire being of such length that when cold the hook 82 is engaged in the slot 83 and flexes the spring member 65 so as to press the roller 84 against the end of the latch bar 53. When a bread slice is inserted into the toaster the parts move to the position shown in Figs. 9 and 14, the slice of bread indicated by the numeral 108 acting to depress the finger 94, which in turn results in upward movement of the latch release member 95. The shoulder 97 of this member engages the lower side of the latch member 86, thus raising the latch and permitting the roller 84 and spring member 85 to move the latch bar 53 to the right in a quick movement and thus bring the finger 54 into engagement with the thermostat strip causing the strip to be snapped overcenter to its opposite position and permitting the contact 74 to come into engagement with contact 73 under action of the switch lever 63, which brings the parts into the position shown in Figs. 9 and 14. As will be seen from Fig. 9, as the finger 94 moves to its lowermost position the latch release lever 95, after lifting the latch, moves on through the opening 98 so that the shoulder 97 is disposed thereabove and the latch drops back into engagement with the upper edge of the latch bar 53 into a position to re-latch the bar when the latter is subsequently snapped back into its initial position upon the termination of the toasting operation. This movement of the latch release 95 is occasioned by action of the latch bar 53 which when released comes against the edge of the latch release lever, swinging it forward so that the shoulder 97 clears the latch and moves through the opening 98.

Current now flows through the heating elements and also through the wire 75 which constitutes a temperature responsive element of the thermal expansion type, the wire having a resistance such as to heat up slowly in response to the passage of current. Thus the passage of electric current through this wire results in appreciable elongation thereof in consequence of its temperature rise, the arrangement being such that the wire will be heated to a temperature considerably above its surroundings so that upon termination of the toasting interval it will cool with sufficient rapidity. This elongation permits the spring member 65 to straighten out, which in turn results in movement of the roller 84 away from the latch bar 53, as shown in Fig. 15. Due to the particular arrangement of these parts, the movement of the roller 84 will be many times that of the corresponding movement of the wire 75. Thus for a wire extension of about $\frac{1}{32}$" there results a movement of roller 84 amounting to over $\frac{1}{4}$". The hooked end 82 of the wire is inserted in the slot 83, the long dimension of the slot being in the same direction as the long dimension of the spring member, as shown in Fig. 7. This permits the hooked end of the wire 75 to continue to move freely in the slot after the spring 65 assumes its straight position. This feature is desirable since it permits expansion of the wire to be free of longitudinal stress as it heats up to its higher temperatures. In other words, the wire is under greatest stress when it is at its lowest temperature, which is the condition under which it can most satisfactorily accept such stress without set. The roller 84 moves away from the latch bar until it finally occupies the position shown in Fig. 10, and the latch bar, thus relieved of the pressure due to this roller, also moves backward toward the "Off" position thereof under its own tension. This tension, however, is such as to be inadequate by itself to open the contact points against the tension of the switch lever 63 and thus the parts move into the position shown in Figs. 10 and 15 during the remainder of the toasting interval. In this position of the parts a substantial clearance exists between the strip and the end of the finger 54, as will be apparent from Fig. 15. The purpose of this clearance is to permit the thermostat to snap freely through a substantial distance before it is required to work against the friction of the parts and the spring tension holding the contacts together. This feature contributes materially to reliable and uniform operation of the control mechanism.

When the strip 39 reaches the temperature for which it is set, it snaps through to the opposed position shown in Fig. 8, engaging the end of the finger 54 and moving the latch bar 53 past the depending portion 87 of the latch member. During this movement the end of the latch bar comes into engagement with the insulation block 85, flexing the switch lever 63 and opening the contacts 73 and 74 to terminate the toasting operation. At this instant the parts occupy the position shown in Figs. 11 and 16. The circuit now being broken, the wire 75 begins to cool and contract and the roller 84 eventually begins to press against the latch bar 53. When the wire cools sufficiently the latch bar will be moved under this pressure until it engages the depending portion 87 of the latch member, this movement, however, being insufficient to permit closing of the contacts 73 and 74. When the toasted bread slice is removed from the toaster the finger 94 moves upwardly, thus causing the latch release lever 95 to drop until the notch 97 passes beneath the latch member, bringing the parts back into the position shown in Fig. 8. Likewise, if the toasted bread slice is removed before the wire 75 is cooled sufficiently to move the latch bar 53, the shoulder 97 will nevertheless drop below the latch member, and if the wire cools before another bread slice is inserted, the parts will also return to the position shown in Fig. 8.

Fig. 12 shows the relative position of the latch and associated parts when a bread slice is removed very soon after the switch is turned off and a new bread slice is immediately inserted in the toaster. Under these circumstances when the new slice of bread is inserted and the finger 94 is depressed as shown in Fig. 12, the latch release member 95 moves upwardly and the shoulder 97 comes into contact with the lower side of the latch member 86, raising the latch member as shown in this figure out of the way of the latch bar 53. However, under these circumstances the wire 75 may not have cooled sufficiently to deflect the spring member 65 to a degree such that the roller 84 will move the latch lever an amount sufficient to snap the strip back to its initial position so that the parts will occupy the position shown in Fig. 12 for possibly a matter of several seconds or until the wire 75 is cooled. However, as the wire cools the latch bar 53 will be moved by the roller in response to contraction of the wire back to the position shown in Fig. 8 to snap the strip to the "On" position and coincidentally with this movement will engage the edge of the latch release lever 95, swinging it toward the enclosure so that the latch member 86 will drop down to the position shown in Figs. 9 and 10 and into a position to re-latch the latch bar when it is subsequently moved to the "Off" position.

Attention is directed to a number of novel features of the invention, among these being the arrangement by which the bimetallic strip is moved to its "On" position. It will be seen that the energy necessary to accomplish this operation is produced by the wire 75, the action of which is restrained by latch means until a slice of bread is inserted into the toaster. This makes it possible to use the energy delivered by the slice of bread in dropping into position for the purpose of bringing about a reset operation which would not in itself provide sufficient energy to reset the thermostat. After the thermostat is reset to its "On" position, the reset mechanism functions for a short period of time to retain the strip in its "On" position, and thereafter the reset mechanism gradually releases the pressure on the thermostat strip. This gradual release is a matter of some importance in the operation of the device, for it will be seen that if the strip were simply snapped over, it is possible that under some circumstances the thermostat stop 107 might act to snap the strip back to the "Off" position if the strip had not cooled sufficiently. Furthermore, it is possible for the thermostat to continue to rise in temperature even after it is snapped "Off" and deenergized the electrical circuit. Because of the unavoidable mass in the thermostat itself it will slightly lag in response to the bread surface temperature and thus continue to rise in temperature a small amount even after the temperature of the bread surface ceases to do so. However, it is probable that the bread surface also continues to rise slightly in temperature for some time after the current is shut off because it still continues to receive some heat from the heating elements because of the stored heat remaining therein due to their mass. It will also be seen that if the bread slice is removed immediately after the toaster shuts off, then the thermostat strip itself is exposed to direct radiation of stored heat from the heating element 25 and continues to rise in temperature. The possibility of any of these actions affecting the operation of the toaster is avoided by arranging the reset so that the pressure on the thermostat strip is released only after the thermostat has cooled sufficiently to remain in the "On" position after the release of the pressure. The action of this secondary temperature responsive means does not require critical adjustment. It is only necessary that the pressure exist until the thermostat has cooled well below its cut off temperature (a matter of but a few seconds after insertion of the bread slice) and that the pressure be fully released before the bread slice is completely toasted so as to avoid interferring with free movement of the thermostat at the end of the toasting interval.

Attention is also directed to the novel features of the latch mechanism by which the latch bar is latched in a position to hold the contacts open in response to movement of the strip and which permits of delayed return of the thermostat to its "On" position where bread slices are toasted in rapid succession.

My invention is applicable to cooking devices and other devices wherein successive heating operations are to be timed, indicated, or controlled.

While I have thus described and illustrated a specific embodiment of the invention, this is by way of illustration and not limitation, and I do not wish to be limited except as required by the scope of the appended claims.

I claim:

1. The combination in a control mechanism for toasters having a toasting oven and heating means for toasting a bread slice in the toasting oven, of a snap acting thermostat arranged to snap from a first position to a second position when heated in order to terminate a toasting interval, means for applying an external pressure on said thermostat, and means responsive to the insertion of a slice of bread into the toaster for rendering said last mentioned means effective to apply said external pressure on said thermostat to move said thermostat to said first position thereby resetting said thermostat for a subsequent toasting interval.

2. The combination in a control mechanism for toasters having a toasting oven and heating means for toasting a bread slice in the toasting oven, of a thermostat comprising a bimetallic strip arranged to snap from a first position to a second position when heated to terminate a toasting interval, means for applying an external pressure on said strip, and means operated in response to the insertion of a slice of bread into the toaster for rendering said last mentioned means effective to apply said external pressure to said strip to move said strip to said first position thereby resetting said strip for a subsequent toasting interval.

3. The combination in a control mechanism for a toaster of a thermostat comprising a bimetallic strip arranged to snap from a first position to a second position when heated to terminate a toasting interval, reset means for applying an external pressure to said strip to actuate the same back to the first position to reset the strip, latch means engageable in response to movement of the strip from the first position to the second position for preventing operation of said reset means, and means for releasing said latch upon the insertion of a slice of bread into the toaster to reset said strip to said first position for a subsequent toasting interval.

4. The combination in a control mechanism for a toaster of a thermostat movable to terminate a toasting interval, said thermostat comprising a bimetallic strip arranged to snap from a first to a second position in response to a rise in temperature, switch means movable to open position by said thermostat, latch means engageable when said switch means is moved to open position for latching the switch means in open position, means for releasing said latch means in response to the insertion of a slice of bread into the toaster, and reset means for moving said strip back to said first position when said latch is released to initiate a toasting interval.

5. The combination in a control mechanism for a toaster of a thermostat comprising a bimetallic member arranged to snap from a first to a second position when heated, to terminate a toasting interval, temperature responsive reset means movable in response to a change in temperature thereof in one sense to apply an external pressure on said bimetallic member to actuate the same back to the first position and movable in response to temperature change in the opposite sense to remove said pressure and permit thermostatic movement of said bimetallic member, latch means engageable in response to movement of said thermostat from the first to the second position for preventing the application of pressure to the strip by said reset means, and means for releasing said latch means upon the insertion of a slice of bread into the toaster to reset the thermostat for a subsequent toasting interval.

6. The combination in a control mechanism for a toaster of a thermostat comprising a bimetallic strip arranged to snap from a first to a second position when heated to terminate a toasting interval, temperature responsive reset means movable in response to a change in temperature thereof in one sense to apply an external pressure on said strip to actuate the same back to the first position and movable in response to temperature change in the opposite sense to remove said pressure to permit thermostatic movement of said strip, latch means engageable in response to movement of the strip from the first to the second position for preventing the application of pressure to the strip by said reset means, and means for releasing said latch means upon the insertion of a slice of bread into the toaster to reset the strip for a subsequent toasting interval.

7. The combination in a control mechanism for a toaster of a thermostat comprising a bimetallic strip arranged to snap from a first to a second position when heated, to terminate a toasting interval, a latch bar movable to a latched position in response to movement of the strip from said first to said second position, a switch for controlling the flow of current through the toaster movable to open position in response to movement of said strip from the first to the second position, temperature responsive reset means arranged to be heated upon closing said switch, movable in response to decrease in temperature thereof acting on said latch bar to apply an external pressure to said strip to actuate the same back to the first position and to close said switch and movable in response to rise in temperature thereof to remove said pressure and permit thermostatic movement of said strip, a second latch means engageable with said latch bar in the latched position thereof for preventing the application of pressure to said strip by said reset means and for preventing the closing of said switch, and means for releasing said second latch means upon the insertion of a slice of bread into the toaster to reset said strip and close said switch for a subsequent toasting interval.

8. The combination in a toaster control mechanism of a thermostat movable to control a toasting interval, switch means movable to open position in response to operation of said thermostat, latch means engageable when said switch means is moved to open position for latching the switch means in open position, and means operated by the force exerted by a slice of bread when inserted in the toaster for releasing said latch means to close said switch means and initiate a toasting interval.

9. The combination in a control mechanism for a toaster having a toasting oven and heating means for toasting a bread slice in the toasting oven, of a thermostat movable in response to toasting heat to control a toasting interval, switch means biased to a closed position, an intermediate means between the switch and the thermostat movable by the thermostat to move the switch to open position, latch means for latching said intermediate member to hold said switch in open position, means actuated by the weight of a bread slice consequent to placing the bread slice in the toasting position for releasing said latch means to close the switch and initiate a toasting interval, and means operable to prevent said closing of the switch by imposing a predetermined delaying action following termination of the preceding toasting operation.

10. The combination in a control mechanism for a toaster of a thermostat movable in response to temperature change to terminate a toasting interval, a switch biased to closed position, a switch operating member movable by the thermostat to open the switch, a gravity operated latch member positioned and shaped to engage the switch operating member in the open position of the switch to prevent closing thereof, a lever positioned for engagement by a slice of bread in the toaster for actuation by the weight thereof, and a release member operated by said lever to raise the latch member and release the switch operating member to initiate a toasting interval, said latch release member being disposed in the path of the switch operating member for operating thereby to disengage the latch release member from the latch member to reposition the same for a subsequent latching operation.

11. The combination in a control mechanism for a toaster having a toasting oven and heating means for toasting a bread slice in the toasting oven, of a thermostat movable in response to temperature change to terminate a toasting interval, a switch biased to closed position, a switch operating member movable by the thermostat to open the switch, a gravity operated latch member positioned and shaped to engage the switch operating member in the open position of the switch to prevent closing thereof, a latch release member for raising the latch member to release the switch operating member and initiate a toasting interval, and means for operating said latch release member in response to weight of a bread slice consequent to insertion of the slice into the toaster oven, said latch release member being disposed in the path of the switch operating member for operation thereby to disengage the latch release member from the latch member and reposition the same for a subsequent latching operation.

12. The combination in a control mechanism for toasters of a snap-acting thermostat movable from a first position to a second position when heated to terminate a toasting operation, a latch bar adapted to be moved by the thermostat in moving from the first to the second position, a switch biased to closed position and positioned to be opened by the latch bar in response to said thermostat movement, reset means adapted to act on said latch bar to bring the same into contact with the thermostat and return the thermostat back from the second to the first position, said reset means including a temperature responsive element controlled by said switch for moving the reset means to apply said pressure when cooled and to release the pressure when heated, said latch bar being arranged to rest in spaced relation to said thermostat when the pressure of said reset means is removed therefrom, for free movement of the thermostat during the initial part of its movement from the first to the second position, latch means engageable with said latch bar when the thermostat moves to the second position to latch the switch in open position and restrain operation of the reset means, and means for releasing said latch upon the insertion of a slice of bread into the toaster to close said switch and reset said thermostate to the first position and thereby initiate a toasting interval.

13. The combination in a control mechanism for a toaster of a thermostat comprising a strip of thermostat bimetal, means for supporting said strip at the ends thereof to prevent angular temperature responsive movement of said ends and thereby induce under temperature change, forces in the strip tending to produce movement of a part of said strip in one direction in response to temperature changes of structure surrounding said strip, and means for directing radiant emission from the surface of a slice of bread in the toaster against the central portion of said strip to induce forces therein tending to produce movement of said part in the opposite direction under temperature changes in the same sense to produce a net movement of said part responsive to the temperature of the slice surface and substantially independent of the temperature of surrounding portions of the toaster, switch means movable to open position by said part of the strip, latch means engageable when said switch is moved to open position for latching the switch means in open position, and means for releasing said latch means in response to the insertion of a slice of bread into the toaster to initiate a toasting interval.

14. The combination in a control mechanism for a toaster of a thermostat comprising a strip of thermostatic bimetal stressed longitudinally to move, when heated, between a first position nearest a slice of bread supported in said toaster and a second more remote position to terminate a toasting interval, the width of the strip being greater in the central portion than near the ends thereof, means for supporting said strip at the ends to prevent angular temperature responsive warpage of said ends and thereby induce in the strip, under temperature change, forces tending to move a part of said strip in one direction, said ends being supported in good conductive relation to surrounding parts of the toaster to cause said ends to be primarily temperature responsive to said parts, and means for directing radiation from the surface of said slice against the central portion of the strip to induce forces in the strip tending to move said part in the opposite direction under temperature change in the same sense to produce a net movement of said part responsive to the temperature of the slice surface and substantially independent of the temperature of the surrounding toaster elements, reset means for applying an external pressure to said strip to actuate the same back to the first position to reset the strip, latch means engageable is response to movement of the strip from the first position to the second position for preventing operating of said reset means, and means for releasing said latch upon the insertion of a slice of bread into the toaster to reset said strip to the first position for a subsequent toasting interval.

15. In combination, heating means adapted to have an "On" and an "Off" operation, means for supporting a slice of bread in a toasting position, means for causing heat from said heating means to be substantially uniformly distributed over an entire side surface of the bread slice for toasting the same, and control mechanism for said heating means including a thermostat positioned in the path of radiation emitted by a portion of said surface and substantially protected against heat transfer direct from the heating means and being responsive to said radiation to cause the "Off" operation of the heating means at a predetermined temperature value, said thermostat having snap action movement in opposite directions to cause the "Off" and "On" operations of the heating means, and said control mechanism including pressure applying means operative to exert external pressure against said thermostat to cause snap action thereof to a position effecting said "On" operation, said pressure applying means acting to maintain pressure against said thermostat for a predetermined period after the latter has been snapped to said "On" position.

16. A toaster having, in combination, heating means for toasting, a thermostatic switch having a snap acting thermostat responsive to toasting heat for shutting off the heating means when the object being toasted is heated to a predetermined degree, means for latching the switch in the shut off condition, means operable to unlatch the switch to permit turning on of the heating means, and means for effecting a delaying action in applying pressure to move the switch toward its "On" position only after a time period has elapsed after termination of the preceding toasting operation and to maintain such pressure for a time period sufficient to avoid premature operation of the switch to its "Off" position.

17. A toaster having, in combination, means for toasting an object such as a bread slice, a thermostatic switch device for controlling the toasting interval including an "On" and "Off" switch and a thermostat having a snap action from a first position to a second position when heated to a predetermined value, said snap action effecting movement of the switch to the "Off" condition and terminating the toasting interval, means latching the switch device in the "Off" condition upon termination of the toasting interval means for unlatching the switch device, means having a delaying action to prevent movement of the switch to the "On" condition for a predetermined period immediately or soon after the termination of the preceding toasting interval, said predetermined period being sufficient to permit the thermostat to cool to a predetermined low temperature below its switch shut off value, and means operable to start a toasting operation and serving by such operation to effect said unlatching and also to make said delaying action means effective.

18. In a toaster, electric heating means for toasting a bread slice, a snap acting thermostat adapted to terminate the toasting interval in response to heat emitted from the surface being toasted, an "On" and "Off" switch for controlling the heating means, a second thermostat means adapted to be latched in a restrained condition when cool and arranged so that when it is unlatched its stored up energy will be applied to cause the switch to be moved from the "Off" to the "On" condition and simultaneously to cause the first mentioned thermostat to be moved from a position corresponding with the "Off" position of the switch to a position corresponding with the "On" condition of the switch, the first thermostat means snapping to the "Off" position when heated to a predetermined temperature and by such movement causing the switch to be moved to the "Off" condition, means for latching the second thermostat means and the switch in the "Off" condition, and means to unlatch the switch and the second thermostat means in response to moving a bread slice to the toasting position.

19. A toaster as set forth in claim 18, including a second latch means to prevent said movement of the first thermostat means to the "On" condition until the second thermostat means has cooled to a degree sufficient for exerting said energy.

20. In a toaster, in combination, means for supporting a bread slice in toasting position, heating means for toasting the bread slice in said position, a snap acting thermostat adapted to abruptly change from "On" to "Off" positions to determine the toasting interval, and control mechanism for the heating means to control a toasting cycle starting with the insertion of a bread slice to said toasting position and continuing through a controlled toasting interval, said control mechanism comprising a switch having "On" and "Off" positions for energizing and deenergizing the heating means, a latch device having a first latching means and a second latching means, the first latching means serving to maintain the switch latched in the "Off" position and adapted to be unlatched to permit movement of the switch to the "On" position, a control member operable to initiate a toasting cycle, the second latching means being latched in response to operation of said control member to initiate a toasting operation, and pressure applying means adapted to be held latched by said first latching means for a predetermined period and adapted when released by unlatching of said first latching means to cause movement of the thermostat to the "On" position, said pressure applying means serving to provide a predetermined lag in actuation of the switch to its "On" position independently of the thermal condition of the thermostat, whereby to prevent premature movement of the thermostat to the "On" position when a bread slice is inserted to be toasted immediately or soon after the completion of a preceding toasting operation.

21. The combination in a control mechanism for a toaster comprising a heater, an object such as a slice of bread adapted to be heated thereby, means including a thermostat responsive to radiant heat emitted from the object for terminating the heating of said object, said means comprising a strip of thermostatic material, means supporting each end of the strip against lateral and angular motion and with a central portion of the strip exposed to radiant heat emitted from the object being heated, the thermostat strip being snap acting in opposite directions, means for terminating said heating operation arranged to be actuated by snap acting movement of the thermostat strip when the strip is heated to a predetermined value, the strip having a portion for actuating said terminating means which portion is responsive in an actuating movement which is the sum of a primary thermostatic action in one direction in response to said radiant heat and a secondary thermostatic action in the opposite direction in response to temperature of the fixedly mounted end portions, means operative against the thermostat strip to cause snap acting movement thereof in the direction opposite from that for terminating the heating operation whereby to start the heating operation, and means for applying pressure externally to the thermostat strip for a determined period after it has been moved to said starting position, said period being of sufficient duration to assure that the thermostat strip has dropped to a temperature closely related to the bread surface temperature.

22. In combination, heating means, means for supporting an object in coactive relation with the heating means for heating said object, a thermostatic device responsive to temperature of said object being heated and including a thermostatic member adapted to move between an "On" and an "Off" position to control said heating means, said thermostatic device constructed and arranged so that said thermostatic member requires external pressure to effect movement from the "Off" to the "On" position and moves from the "On" to the "Off" position in response to predetermined rise in temperature under influence of said heating means, pressure applying means operative to apply pressure externally to the thermostatic member to move it from the "Off" to the "On" position, and means for causing said pressure applying means to act to slowly and gradually release said pressure for a predetermined period following the movement of the thermostatic member to the "On" position.

23. The combination set forth in claim 22, in which the thermostatic member is shielded from direct heat from the heating means and is responsive to surface temperature of the object mainly by radiant heat transmission to effect movement of the thermostatic member from the "On" to the "Off" position, and in which the period of application of said external pressure to maintain the thermostatic member in the "On" position is sufficient for the temperature of the thermostatic member to become closely related to the temperature of the surface of the object to which said thermostatic member is responsive by radiation, whereby to stabilize the thermostatic member and bring it into predetermined temperature relation to said surface at the start of a heating operation.

24. An automatic toaster having means for toasting a bread slice, a thermostat arranged to move from a first position to a second position in response to toasting heat to thereby terminate a toasting interval, means operative to externally apply pressure to said thermostat to move it from said second to said first position to start a toasting operation, a second thermostat responsive to heat incident to said toasting operation constructed and arranged so that by its rise in temperature it acts to gradually reduce said pressure for a period long enough for the first mentioned thermostat to be cooled to a value below its shut off value following termination of the preceding toasting interval.

25. An automatic toaster as set forth in claim 24, in which the second thermostat includes a thermally responsive wire member arranged to have a pressure applying function in response to cooling and a pressure reducing function in response to heating, and means coordinating said functions with the means for applying external pressure to the first mentioned thermostat whereby the pressure applying function is effective in moving the first thermostat from the second position to the first position and in which the pressure releasing function is effected after the first thermostat has been moved from said second position to said first position.

26. In a toaster, electric heating means for toasting a bread slice, means for starting a toasting period, a thermostat device responsive mainly to radiation emitted from the surface being toasted to terminate the toasting period, and a second thermostat device responsive to simultaneous passage of current through it and said heating means for applying a reducing pressure action in response to said heating and an increasing pressure action in response to cooling, and means whereby said increasing pressure action is exerted against the first mentioned thermostat device sufficient to push the first mentioned thermostat to its "On" position and whereby the reducing pressure action is exerted following said movement of the first mentioned thermostat to the "On" position.

27. A toaster as set forth in claim 26, in which said reducing pressure is slowly and gradually reduced in response to increase in temperature of said second thermostat device when the toaster is brought to its toasting condition.

28. An automatic toaster comprising heating means for toasting a bread slice, a thermostatic device for controlling said heating means including a thermostat responsive to toasting heat arranged to move from a first position wherein the heating means is "On" to a second position wherein the heating means is "Off" to terminate a toasting interval, and a second thermostat in cooperative relation with the first mentioned thermostat operative to press the latter toward its first position and continue to apply pressure tending to maintain said first mentioned thermostat in said first position for a period long enough to offset any tendency of the first mentioned thermostat to return to its second position for a predetermined period following termination of a toasting interval, and means for causing said second thermostat to be heated and cooled in succession so as to have opposite thermostatic actions in response to rise in temperature from heating and drop in temperature from cooling, one of said functions of the second thermostat serving to impose the described pressure against the first mentioned thermostat.

29. A toaster having, in combination, heating means for toasting a bread slice, a thermostatic device for controlling the application of heat from said heating means to effect the toasting interval including a thermostat having a snap action from a first position to a second position when heated to a predetermined value in response to toasting heat to thereby terminate the toasting interval, means operative to effect snap action movement of said thermostat from said second position to said first position including a second thermostat responsive to heat incident to said toasting operation, said second thermostat being in cooperative relation with the first mentioned thermostat and arranged to apply pressure in a direction to cause movement of the first mentioned thermostat toward the first position upon starting the toasting operation, and said second thermostat acting in response to said heat incident to toasting, the latter thermostat action serving to slowly and gradually release said pressure against the first mentioned thermostat, said releasing pressure continuing for a predetermined period whereby to prevent the first mentioned thermostat from prematurely snapping back to said second position when starting the toasting interval.

30. A toaster as set forth in claim 29, in which the second thermostat has a cooling function applied for storing up energy for the application of said pressure tending to move the first mentioned thermostat in said snap action for starting the toasting interval.

31. A toaster as set forth in claim 18, in which the second thermostat means is heated as an incident to the toasting operation and its response to said heat is slow acting in a direction to slowly and gradually release its pressure tending to hold the first mentioned thermostat in the "On" position.

32. A control mechanism as set forth in claim 21, in which the pressure applied by the last mentioned means is released slowly and gradually.

33. In combination, heating means, means for supporting an object in position to be heated by said heating means, a thermostatic device responsive to heat incident to heating said object and including a thermostatic member arranged to move between an "On" and an "Off" position to control said heating means, said thermostatic member being normally in an "Off" position and being responsive to predetermined rise in temperature for movement to said "Off" position, pressure applying means operative to be brought into pressure applying and pressure releasing coaction with the thermostatic member, means to effect said pressure applying coaction upon termination of a heating interval to effect movement of the thermostatic member from the "Off" to the "On" position in response to said predetermined heating of said member, and said pressure releasing coaction serving to slowly and gradually release said pressure following the movement of the thermostatic member to the "On" position, said pressure applying coaction continuing for a period sufficient to prevent premature response of the thermostatic member from the "On" to the "Off" position.

LUDVIK J. KOCI.

REFERENCES CITED

The following references are of record in the file of this patent:

UNITED STATES PATENTS

| Number | Name | Date |
| --- | --- | --- |
| Re. 18,923 | Harris | Aug. 22, 1933 |
| 1,516,054 | Mottlau | Nov. 18, 1924 |
| 1,540,628 | Hurxthal et al. | June 2, 1925 |
| 1,944,449 | Munro | Jan. 23, 1934 |
| 2,032,136 | Lee | Feb. 25, 1936 |
| 2,112,422 | McCullough et al. | Mar. 29, 1938 |
| 2,167,121 | McCreary et al. | July 25, 1939 |
| 2,196,393 | Ireland | Apr. 9, 1940 |
| 2,237,146 | Ireland | Apr. 1, 1941 |
| 2,264,093 | McCullough | Nov. 25, 1941 |
| 2,269,162 | Newell | Jan. 6, 1942 |
| 2,271,485 | Koci | Jan. 27, 1942 |
| 2,275,265 | Mead | Mar. 3, 1942 |
| 2,290,660 | Wilcox | July 21, 1942 |
| 2,332,518 | Koci | Oct. 26, 1943 |
| 2,363,169 | Fischer | Nov. 21, 1944 |